(12) United States Patent
Berthaud et al.

(10) Patent No.: US 6,961,220 B2
(45) Date of Patent: Nov. 1, 2005

(54) LASER WELDED HEAD DRUM FOR VCR

(75) Inventors: Philippe Berthaud, Tonnerre (FR); Michel Perrot, Collan (FR)

(73) Assignee: Thomson Licensing, Boulogne-Billancourt (FR)

( * ) Notice: Subject to any disclaimer, the term of this patent is extended or adjusted under 35 U.S.C. 154(b) by 275 days.

(21) Appl. No.: 10/081,285

(22) Filed: Feb. 22, 2002

(65) Prior Publication Data

US 2002/0122277 A1    Sep. 5, 2002

(30) Foreign Application Priority Data

Mar. 1, 2001    (EP)    ................................ 01400546

(51) Int. Cl.⁷ ............................................ G11B 21/04
(52) U.S. Cl. ................................................ 360/271.5
(58) Field of Search ........................... 360/271.1, 271.5, 360/271.6

(56) References Cited

U.S. PATENT DOCUMENTS

| 4,692,822 A | | 9/1987 | Kabacinski | 360/84 |
| 5,459,625 A | | 10/1995 | Ohshima et al. | 360/84 |
| 5,486,966 A | * | 1/1996 | Ahn | 360/271.6 |
| 5,568,334 A | * | 10/1996 | Lee | 360/271.1 |
| 6,078,464 A | | 6/2000 | Takeda et al. | 360/84 |
| 6,724,579 B2 | * | 4/2004 | Jeong | 360/271 |

FOREIGN PATENT DOCUMENTS

| DE | 3505362 A1 | | 2/1984 | G11B 15/60 |
| EP | 944042 A1 | | 9/1999 | G11B 5/53 |
| JP | 60038703 | | 2/1985 | G11B 5/02 |
| JP | 05166249 A | * | 7/1993 | G11B 15/00 |
| JP | 06215453 | | 8/1994 | G11B 15/61 |

* cited by examiner

*Primary Examiner*—David Davis
(74) *Attorney, Agent, or Firm*—Joseph S. Tripoli; Robert B. Levy; Jorge Tony Villabon

(57) ABSTRACT

In a video recorder with a rotary head drum, a lower drum (1) and drum base (2) are joined together by laser welding to simplify assembly and reduce manufacturing cost.

7 Claims, 2 Drawing Sheets

LASER WELDED HEAD DRUM FOR VCR

This invention relates generally to rotary drums of tape recorders for recording and/or reproducing signals according to helical scan system and, more particularly, to an assembly of the rotary drum.

BACKGROUND OF THE INVENTION

As is well known from video recorders, the rotary drum comprises a rotary part (upper drum) and a stationary part (lower drum), and forms a drum unit with a so-called drum base by means of which the drum is being arranged with a tilt angle with respect to the plane of recorder's tape deck chassis. For joining drum and drum base together, screw joints (as, for example, illustrated in FIG. 5) between drum base and the lower drum have been proved to be very worthwhile.

According to another solution, the tilt angle can be also realized by stamping the tape deck chassis accordingly. This solution is cheaper as it facilitates mounting the drum directly on the tape deck chassis, i.e. without the drum base mentioned before. This solution, however, has the drawback to be less accurate.

SUMMARY OF THE INVENTION

The present invention provides a solution which is economical and which facilitates accurate drum mounting.

It is object of the present invention to provide a solution which is economical and which facilitates to mount the drum accurately.

This object is solved by a drum unit as specified in claim 1. Advantageous embodiments are specified in the subclaims.

The present invention is based on the idea to join lower drum and drum base together by welding, particularly by means of laser welding. This solution simplifies assembly of lower drum and drum base, called lower drum assembly in the following.

As, according to the present invention, screw joints between drum base and the lower drum are not needed, screws can be saved and thus, drilling of tapped holes as well as screw holes can be avoided. Another benefit of this invention is that a machining regarding surface finish of the drum base and the lower drum for fitting them together (before assembling) is no more necessary and thus can be dispensed with.

Furthermore, measures may be provided to facilitate assembly procedure of the lower drum assembly which, particularly, can be realized by simple mouldings within lower drum and/or drum base.

Hence, costs of manufacturing drum units are greatly reduced.

BRIEF DESCRIPTION OF THE DRAWINGS

The present invention will now be described in more detail with reference to the accompanying drawing which shows in:

FIG. 3 a plan view of the lower drum assembly according to the second embodiment of the invention, and
b) a sectional illustration of a.

DETAILED DESCRIPTION

Figure 1:
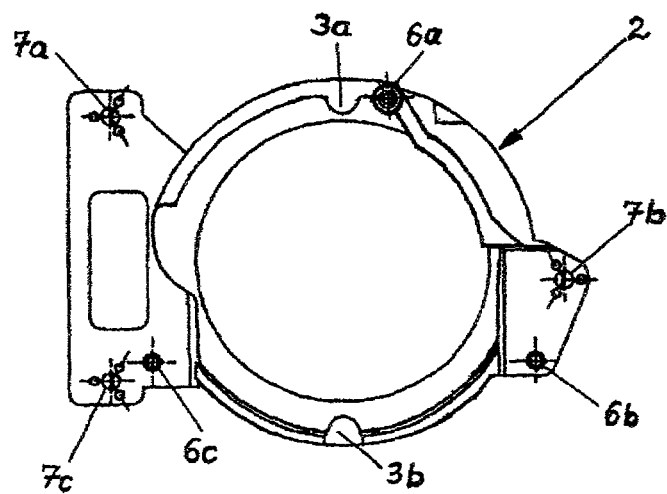
FIG. 1 a plan view of a drum base of a lower drum assembly according to the first and/or the second embodiment of the invention.

It should be pointed out initially that throughout the FIGS. 1–5 identical or equivalent elements/parts are designated with the same reference numerals or letters for sake of simplicity of the explanation.

Figure 5:
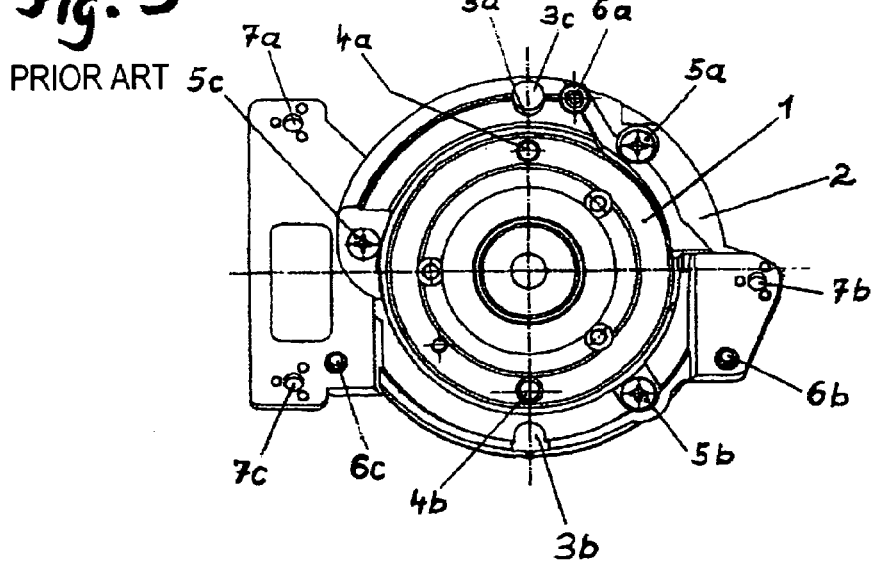
FIG. 5 a lower drum assembly according to prior art.

FIG. 5 shows a schematic illustration of a lower drum assembly according to prior art used in a rotary drum unit of a tape recorder for recording and/or reproducing signals according to helical scan system. FIG. 5 is a bottom view, i.e. looking from the tape deck chassis (not shown) of the recorder, of the lower drum assembly. Lower drum 1 and drum base 2 are joined together by three screw joints being arranged close to the circumference of lower drum 1 assembly. As can be taken from this figure, to facilitate assembly procedure of lower drum 1 and drum base 2 there are provided indexing holes 3a, 3b and an indexing pin 3c as well as other holes 4a, 4b to position lower drum 1 with respect to the drum base 2 and fit them together, respectively, before joining them together by means of screws 5a–5c which are screwed into the lower drum 1.

The drum base 2 has positioning pins 6b–6c for engaging corresponding holes of the tape deck chassis and a pin 6a for engaging a corresponding hole of an electronic board (not shown), and, furthermore, the lower drum base 2 has holes 7a–7c for screw joints (not shown) of the drum base 2 with the tape deck chassis when the drum unit is arranged on the tape deck chassis.

FIG. 1 is a schematic illustration of a drum base 2 to be used for lower drum assemblies according to a first (FIG. 2) and a second (FIG. 3a) embodiment of the present invention. In contrast to the lower drum assembly according to the prior art, the drum base 2 of the first and the second embodiment, respectively, does not need any screw joints of the drum base 2 with the lower drum 1 because they are joined together by welding, particularly by means of laser welding (FIG. 4). However, the same material can be used, i.e. preferably conventional material like aluminium alloy.

For lower drum assemblies—according to the present invention by welding lower drum 1 on drum base 2 and vice versa, respectively—it is advantageous when the same aluminium alloy is used for each part, notably, to have a similar melting temperature. For example, aluminium alloys according to type ADC12 (Japanese norm) or according to type AS9U3 have been proved (European norm) to be well suited. But also a combination of both, i.e. one part is of ADC12 and the other part is of AS9U3, has been proved to be suitable, too.

Figure 2:
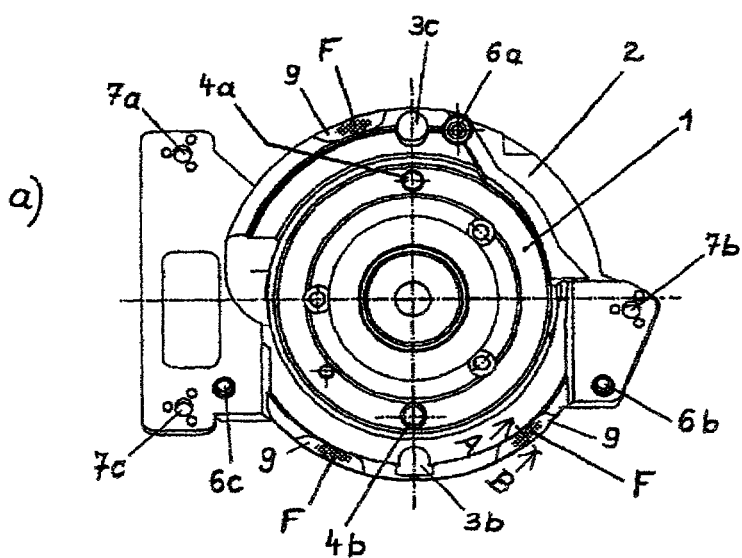
FIG. 2 a) a plan view of the lower drum assembly according to the first embodiment of the invention, and
b) a sectional illustration of a detail.
Figure 3:
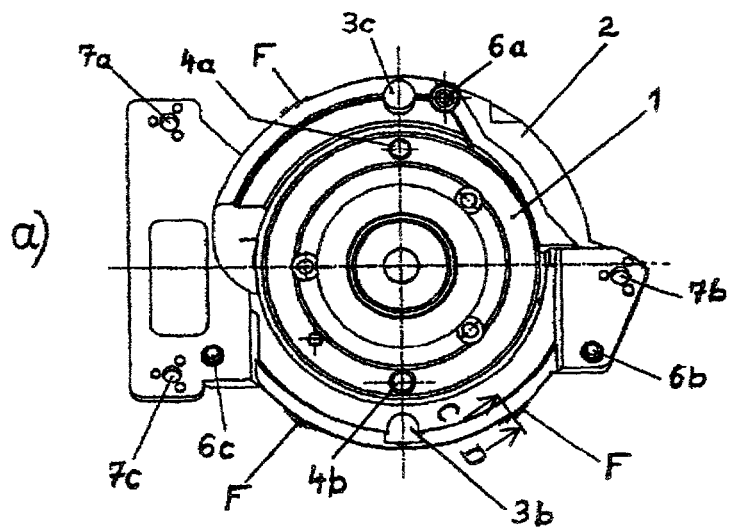
Figure 4:
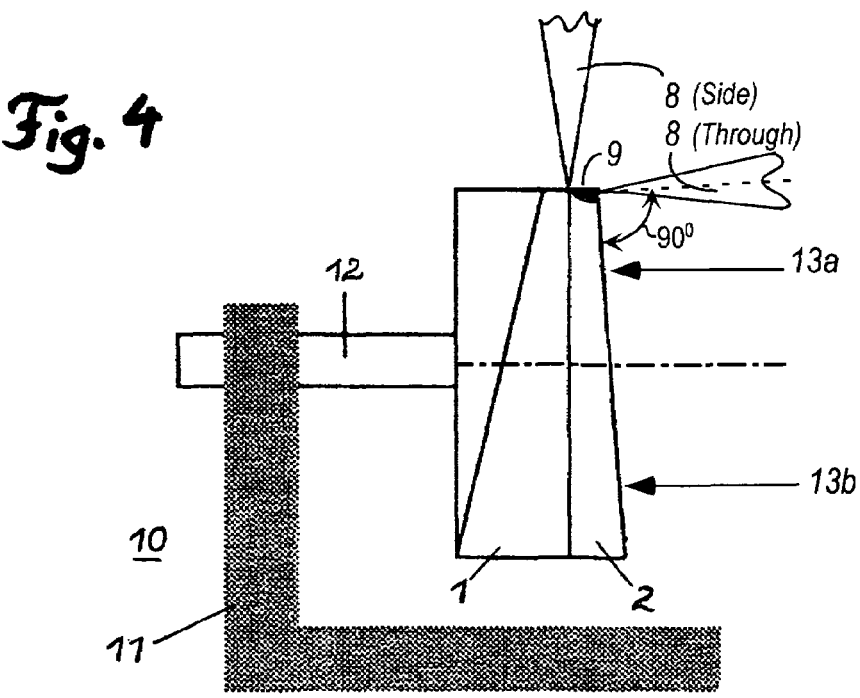
FIG. 4 a welding jig.

FIG. 2 and FIG. 3 illustrate the principle for two preferred embodiments of lower drum assembly according to the present invention, wherein a) is a bottom view of the respective lower drum assembly and b) a sectional view according to the intersection line A–B and C–D, respectively, showing welding areas F as the result of the laser welding. The welding areas F are depicted by dotted areas.

The first (FIG. 2) and the second (FIG. 3) embodiment can be distinguished from one another by the method how a corresponding laser beam 8 is applied. These methods are herein called "through-welding" and "side-welding", respectively. The first embodiment (FIG. 2) uses the method "through-welding", whereas the second embodiment (FIG. 3) uses the method "side-welding". The methods will be described now:

1. "Through-Welding"

The laser beam 8 is applied, for example, to the lower side of the drum base 2, called looking-down surface in the following. The alloy melts up to the upper surface of the drum base 2 and even on the lower surface of the lower drum 1. Welding is thus realized.

For facilitating the welding process the looking-down surface of the drum base 2 is provided with regions 9 of reduced thickness where the laser beam 8 is to be applied.

2. "Side-Welding"

The laser beam 8 is applied in a predetermined radial manner so that the alloys melt together accordingly at certain areas F at the circumference of the lower drum assembly where the drum base 2 and the lower drum 1 abut.

FIG. 4 shows with a schematic illustration the principle of a welding jig 10 used for the lower drum assembly procedure according to the present invention. The welding jig 10 essentially comprises a holder 11 and a shaft 12. The shaft 12 is similar to drum's driving shaft but, in this case, used as a facility to arrange lower drum 1 and drum base 2 in connection with a drum base fixation jig (not shown). As it is illustrated by means of arrows 13a, 13b the drum base fixation jig engages with the drum base 2 in a defined manner in order to fit and press drum base 2 and lower drum 1 together before joining them together by welding due to the respective application of the laser beam 8: According to the method "through-welding", the laser beam 8, labeled (Through) in FIG. 4, is applied to the chassis mounting surface of drum base 2 and is approximately square to the surface of the drum base 2, as depicted in FIG. 4. According to the "side-welding" method, laser beam 8, labeled (Side) in FIG. 4, is radially applied as depicted. In FIG. 4 drum base 2 is shown with region 9 of reduced thickness when laser beam 8 is used for "through-welding".

To avoid deforming the drum, it has to be considered that drum base 2 and lower drum 1 are fitted together closely during the laser welding process, particularly with regard to mass production line. This is achieved by uniform flatness of the upper surface of drum base 2 and the lower surface of lower drum 1 where drum base 2 and lower drum 1 abut so that both the drum base 2 and the lower drum 1 are very close to one another.

For generation of the laser beam 8, there can be used a laser type according to HAAS HPL 62P (from HAAS LASER), for example. A laser beam 8 having a beam diameter 1 mm and a beam angle 76°, for example, has been proved to be suitable.

What is claimed is:

1. Rotary drum for a taps recorder for recording and/or reproducing signals according to helical scan system, comprising:
    a rotary upper drum;
    a stationary lower drum for mounting said rotary upper drum; and
    a drum base for mounting said stationary lower drum to form an assembly having a tilt angle with regard to a tape deck chassis plane, wherein
    said drum base and said lower drum are welded together at an abutting area of the drum base and the lower drum such that said drum base and said lower drum remain free of screw holes for affixing said drum base to said lower drum.

2. The rotary drum according to claim 1, wherein said drum base and said lower drum are welded with a laser beam.

3. The rotary drum according to claim 1, wherein said drum base and said lower drum are through-welded by laser beam directed towards a lower side of said drum base.

4. The rotary drum according to claim 3, wherein said laser beam is applied orthogonally to said lower side of said drum base.

5. The rotary drum according to claim 3, wherein said laser beam is applied orthogonally to said abutting area of said drum base and said lower drum from said lower side of said drum base.

6. The rotary drum according to claim 1, wherein said drum base is provided with regions of reduced thickness for laser beam welding.

7. The rotary drum according to claim 1, wherein said abutting area of said drum base and said lower drum are welded by laser beam applied radially at predetermined circumferential locations.

* * * * *